United States Patent
Knipe

[11] 3,712,037
[45] Jan. 23, 1973

[54] LENGTH-ADAPTABLE ROTARY MOWER BLADE

[75] Inventor: Earl A. Knipe, Warsaw, Ill.

[73] Assignee: Rex Chainbelt Inc., Milwaukee, Wis.

[22] Filed: Dec. 6, 1971

[21] Appl. No.: 204,993

[52] U.S. Cl. .................................................56/295
[51] Int. Cl. .............................................A01d 55/18
[58] Field of Search ......56/1, 295; 30/276, 347, 349; 51/323, 326, 327; 143/133 R, 138

[56] References Cited

UNITED STATES PATENTS

| | | | |
|---|---|---|---|
| 3,104,510 | 9/1963 | Voigt | 56/295 |
| 3,243,944 | 4/1966 | Michaud | 56/295 |
| 88,649 | 4/1869 | Machamer | 143/133 R X |
| 413,753 | 10/1889 | Griffiths | 143/138 |

Primary Examiner—Russell R. Kinsey
Assistant Examiner—J. A. Oliff
Attorney—Ernst W. Schultz

[57] ABSTRACT

The ends of a rotary mower blade are modified so that they may be readily ground to a shorter length and thus readily adjusted to fit in the circular mower housing with the proper clearance of generally not more than about one-half inch or less where required between each tip of a blade and the housing or between the tips of adjacent blades. The blade is provided with marking which facilitates grinding each end without unnecessary measurements.

1 Claim, 6 Drawing Figures

PATENTED JAN 23 1973

3,712,037

INVENTOR.
EARL A. KNIPE
BY
Ernst W. Schultz

LENGTH-ADAPTABLE ROTARY MOWER BLADE

BACKGROUND OF THE INVENTION

The manufacture of replacement mower blades for the many different types of rotary mowers which are available and in use requires providing such blades in many lengths and in increments sometimes as small as one eighth of an inch. The blades are manufactured of an alloy or carbon steel and then hardened. Various means have been proposed for adjusting the length of the blade but to date, grinding the ends of the blades has been considered too tedious and too likely to interfere with the very carefully controlled hardness of the blade which is necessary to provide balanced resistance to wear and toughness.

BRIEF SUMMARY OF THE INVENTION

A portion of the forward edge of the rotary mower blade is beveled to form the cutting edge which extends to the tip of the blade. The blade may have a single cutting edge at one end and a mounting hole at the other end, or the blade may have cutting edges at its corresponding ends and a central mounting hole. Such blades are generally two or more inches in width. Generally the end of the blade from its tip to its heel has a slight inward rake.

According to the present invention, the end of the blade is notched at its heel so that the end section of the blade including the cutting edge is of reduced width and any portion of this end section may be ground away with an ordinary grinding wheel whereby each end of the blade may be readily shortened to fit a particular mower. The length of the section of course, should be no more than the maximum amount which might be removed by grinding, considering also the full length of the next shorter blade which may be used as is.

A typical blade for a rotary mower is about one inch wide as measured from the cutting edge. An end section of reduced width and with the remainder of the blade clear of the grinding wheel, the mower blade may be held by hand at a grinder. Generally a length of about one inch is considered the most that might be removed by grinding. The end section is preferably marked with lines parallel to the end of the section so that each of several blades or each end of a double blade may be ground with the correct rake and to the selected length without having to measure the blade.

DETAILED DESCRIPTION OF THE PREFERRED EMBODIMENT

Figure 1:
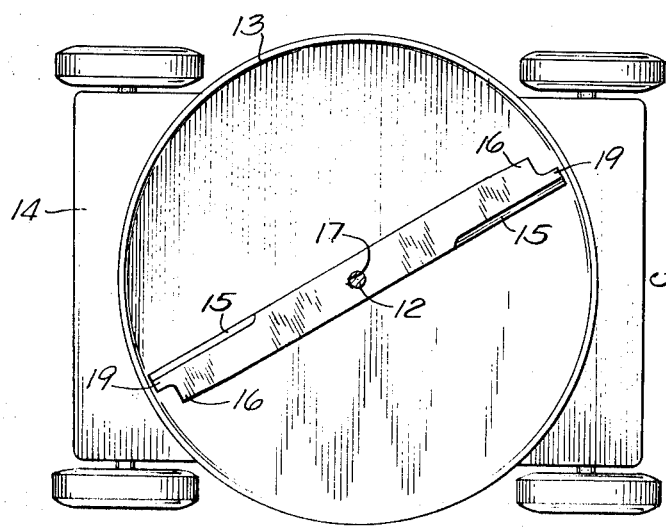
FIG. 1 is a plan view of reduced scale showing a rotary mower blade disposed in the mower housing which is horizontally sectioned immediately above the blade.

The blade 11 shown in FIG. 1 is mounted for rotation on the vertical shaft 12 shown in section and which is located at the center of the circular housing 13 of the mower frame 14. Blade 11 rotates in the clockwise direction as shown and its forward beveled edge portions 15 provide the blade with sharp forward edges for cutting the grass, crop or weeds for which the mower is intended. For better operation under some conditions, a triangular portion of the trailing edge of each end of the blade is bent upwardly to form vanes 16 which with rotation of the blade cause an upsweep of air in the housing and generally keep the blade clear of clippings.

A typical blade is made from No. 5150 or No. 5160 steel which is rolled flat to one-eighth inch thickness and two or more inches in width. After being cut to an approximate length, the center mounting hole 17 is punched and the bar is then bent, trimmed and ground to the desired configuration. All surfaces are then finished by grit blasting for cleaning and the blade is hardened and tempered to between 40 and 48 $Rc$. After recleaning, the forward cutting edges are further sharpened and the blade is painted. The hardness referred to is critical in that the blade must be tough to resist being fractured when it hits a rock or the like, but the blade must also be sufficiently hard to resist wear and maintain its cutting edge.

Figure 2:
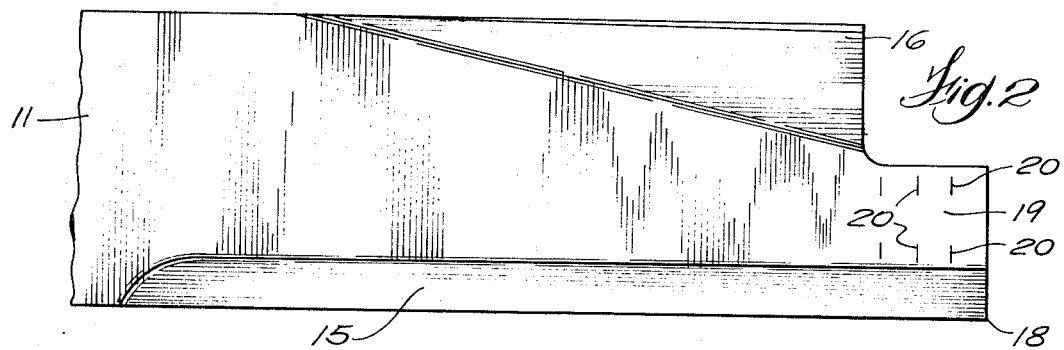
FIG. 2 is a plan of one end of the blade.
Figure 3:
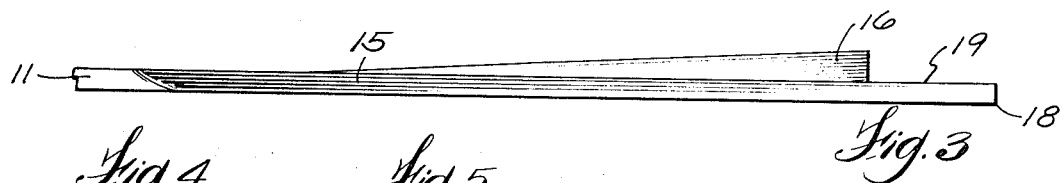
FIG. 3 is a front view of one end of the blade.
Figure 4:
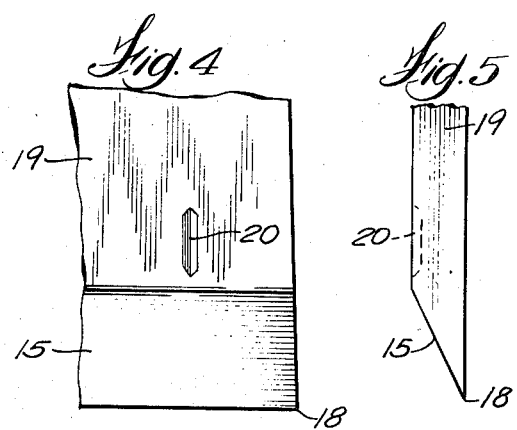
FIG. 4 is an enlarged plan of the forward part of the end of the blade to show one of the markings.
Figure 5:
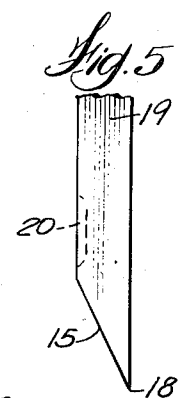
FIG. 5 is an end view of the blade shown in part in FIG. 4. An indentation providing one mark is indicated by broken lines.

The end of the each blade 11 preferably has a slight rake as shown in FIG. 4 so that the tip 18 of the blade at the end of the cutting edge is slightly farther from the mounting hole 17 than is any part of the rest of the blade.

According to the present invention, each end of blade 11 is indented at its heel or rear corner opposite tip 18 such that the end of the blade includes the short end section 19 which extends beyond the end of the trailing portion of the blade or the vane 16.

The reduced width of the end section 19 does not in any way reduce the operability or necessary strength of the blade, unless, of course, it is too narrow, here meaning such as one-half inch. However, if it has a width about one inch, the section is structurally sufficient and can still be readily ground across its end with an ordinary grinder while holding the blade by hand.

To facilitate grinding the end so that the blade will have the desired rake, the section 19 is provided with the markings 20 which may be variously provided. Two indentations for each mark or line are suggested. These marks are readily provided with a die, not shown. The number and spacing of the lines to be indicated is determined by the lengths of the blades which are to be provided a merchant to comprise his complete stock from which one blade may be withdrawn and used as such, if it happens to be of the desired length, or ground to the required length. It is also obvious that if section 19 were, for example, three inches in length, that the amount of grinding required would not justify the reduced number of blades which could be stocked.

On the other hand, the most direct approach is to provide blades of different lengths in increments of one inch as measured from mounting hole 17 such that each end section 19 need be no more than one inch long. Since the clearance between the tip 18 and the housing 13 should be about one-half inch, and whereas a variation of one-eighth inch is generally acceptable, the maximum amount of grinding is indicated to be three quarters of an inch.

Accordingly, also, then the markings should be about one quarter of an inch from each other and from the end of the blade. Obviously, other lengths and increments may be used and will be preferred such as also where the metric system of measure is in use. Blades which operate in tandem generally require a very small clearance which will readily be provided for with the present invention.

Figure 6:
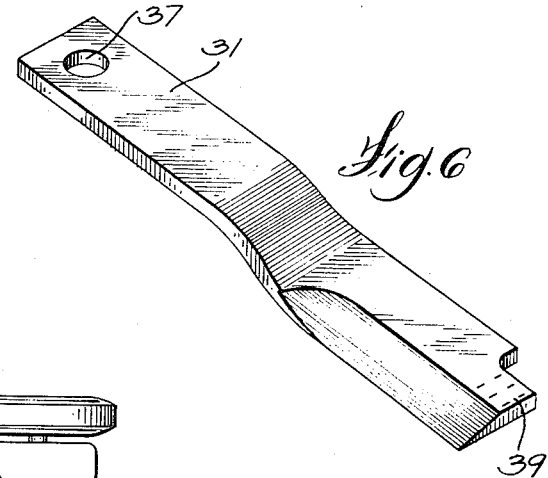
FIG. 6 is a perspective view of another type of mower blade having one cutting edge.

The blade 31 shown in FIG. 6 includes the mounting hole 37 at one end of the blade whereby the blade and other similar blades are bolted to a rotating disc or arms, not shown. The reduced end section 39 is similarly marked whereby the blade length may similarly be reduced by grinding to adjust the same to the desired length.

Reference has been made to the critical hardness of the blade. The present invention contemplates that the blade may be hand-held and that end section 19 or 39 may be ground as described while still exercising reasonable care to prevent overheating of the blade and upsetting its temper.

I claim:

1. A length-adaptable steel rotary lawn mower blade comprising: an elongated cutting blade of steel having a central mounting hole for mounting the blade on a rotatable shaft of a lawn mower, bevelled edge portions on diagonally opposed longitudinal leading edges of the blade adjacent each outer end thereof for cutting, triangular upwardly extending portions on the trailing edges of the blade at the outermost and thereof forming vanes for moving air, the end of the longitudinal leading edges of the blade extending outwardly beyond the end of the trailing edges of the blade providing end sections, each end section being about the same length and width, permanent longitudinally spaced, transversely extending marks at equally spaced intervals on each end section spaced from the end of each end section toward the center of the blade to allow the length of the blade to be shortened by grinding off the outer end of each end section to one of the marks.

* * * * *